United States Patent
Kwatra et al.

(10) Patent No.: US 11,146,597 B2
(45) Date of Patent: Oct. 12, 2021

(54) FILTERING MEDIA DATA IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Shikhar Kwatra, Morrisville, NC (US); Sushain Pandit, Austin, TX (US); Komminist Weldemariam, Nairobi (KE); Vittorio Castelli, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/185,068

(22) Filed: Nov. 9, 2018

(65) Prior Publication Data
US 2020/0153873 A1 May 14, 2020

(51) Int. Cl.
*H04L 29/06* (2006.01)
*H04L 29/08* (2006.01)

(52) U.S. Cl.
CPC ...... *H04L 65/1059* (2013.01); *H04L 65/4092* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 7,930,762 B1 * | 4/2011 | Blair | H04N 7/163 726/28 |
| 8,380,647 B2 | 2/2013 | Perronnin et al. | |
| 2013/0326007 A1 * | 12/2013 | Turner | G06F 21/6254 709/217 |
| 2014/0208340 A1 * | 7/2014 | Poornachandran | H04N 21/44218 725/10 |
| 2015/0302869 A1 * | 10/2015 | Tomlin | G10L 25/48 704/246 |
| 2016/0098644 A1 * | 4/2016 | Hua | G06N 7/005 706/52 |
| 2019/0007356 A1 * | 1/2019 | Loi | H04L 51/043 |

OTHER PUBLICATIONS

Anonymous, "Intelligent method for real-time skip over video frames based on personal viewing policy," An IP.com Prior Art Database Technical Disclosure, IPCOM000235949D, Mar. 31, 2014 (3 pages).

* cited by examiner

*Primary Examiner* — Chris Parry
*Assistant Examiner* — Abderrahmen Chouat
(74) *Attorney, Agent, or Firm* — Griffiths & Seaton PLLC

(57) ABSTRACT

Embodiments for intelligent media data filtering in an Internet of Things (IoT) computing environment by a processor. User preferences for the media data may be determined according to a plurality of identified contextual factors. At least a portion of the media data may be filtered according to one or more user classifications.

17 Claims, 6 Drawing Sheets

FILTERING MEDIA DATA IN AN INTERNET OF THINGS (IOT) COMPUTING ENVIRONMENT

BACKGROUND OF THE INVENTION

Field of the Invention

The present invention relates in general to computing systems, and more particularly, to various embodiments for filtering media data in an Internet of Things (IoT) computing environment computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

SUMMARY OF THE INVENTION

Various embodiments of a filtering data in an Internet of Things (IoT) computing environment computing environment by a processor, are provided. In one embodiment, by way of example only, a method for intelligent media data filtering in an Internet of Things (IoT) computing environment, again by a processor, is provided. A user may be determined to be within a defined proximity to one or more IoT computing devices displaying media data. User preferences for the media data may be determined according to a plurality of identified contextual factors. At least a portion of the media data may be filtered according to one or more user classifications.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
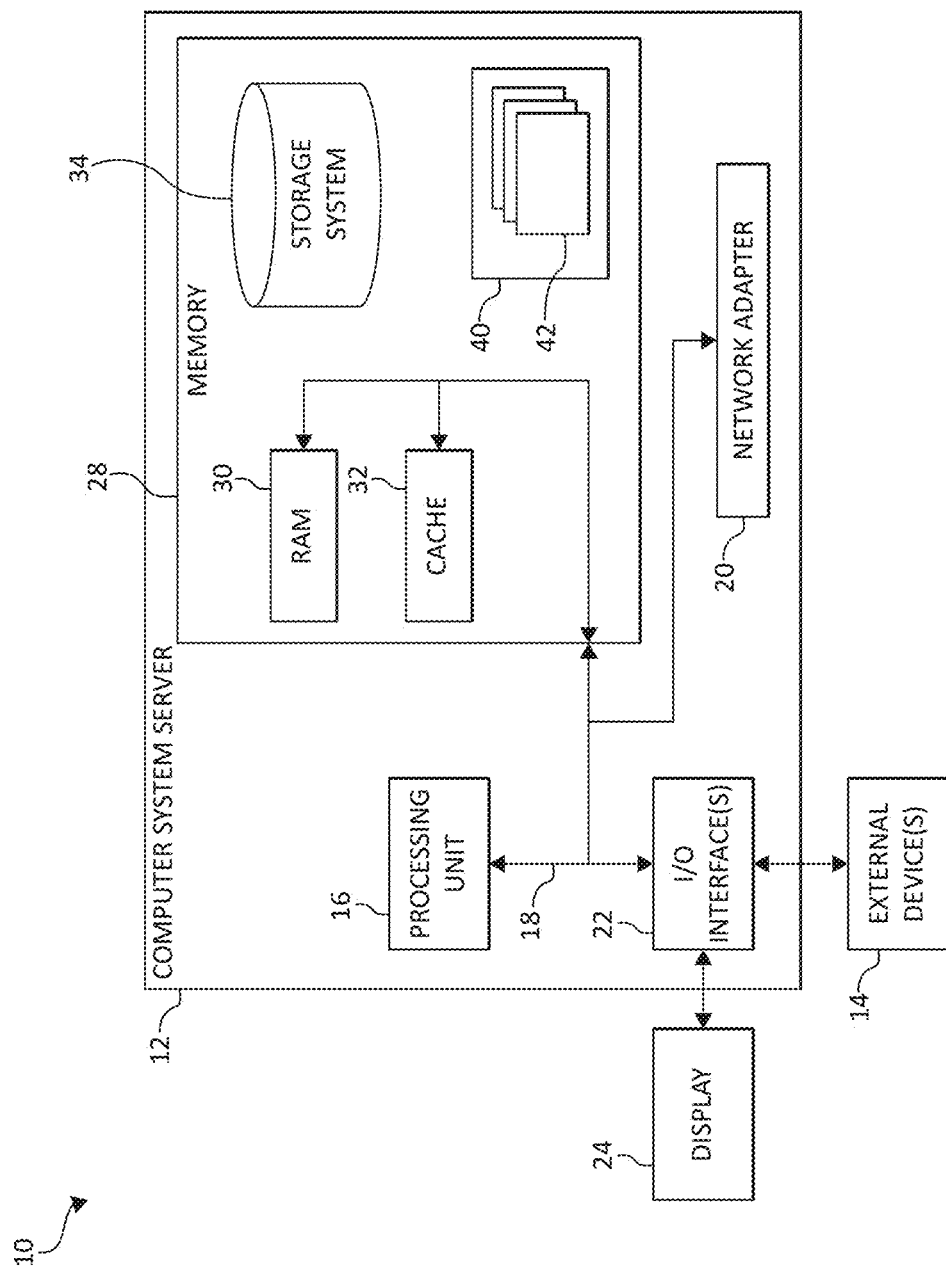
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, while one or more viewers (e.g., adults) are engaged in watching media content (e.g., a movie) in an entertainment system (e.g., a home theater system), a person (e.g., age dependent person) may be accidentally exposed to audio and/or video content when they walk into the environment where such content is played/displayed by the IoT device. Also, age dependent persons may be exposed to age dependent audio and/or video content when they operate controls of audio or video devices without the supervision of adults. Adults who are present in an environment may not be aware of the age dependent persons' presence or may not be able to react quickly enough to prevent the exposure. As such, a need exists to intelligently filter media data and control the media content and associated computing device.

Accordingly, various embodiments are provided to provides for implementing intelligent media data filtering in an IoT computing invention. In one aspect, the present invention combines the detection of the presence of an entity (e.g., a person) using one or more image-capturing devices and the detection of audio/video content (e.g., media content or media data) to trigger a filtering operation to filter, correct, and/or perform one or more ameliorative actions. In one aspect, the filtering actions may include, for example, muting audio data, turning off a video, changing a channel, skipping a portion of the media data to bypass upcoming or displayed non-compliant media content (e.g., non-compliant media as defined/classified in a user profile for a user). Also, the present invention provides for consideration of security and privacy concerns in collecting/analyzing such audio-visual data by relying on abstract representations of a set of similar viewers rather than instances (per viewer basis).

In an additional aspect, the present invention provides a cognitive system for filtering media data in a computing environment (e.g., an IoT computing environment, a cloud computing environment, etc.). A user may be determined to be within a defined proximity to one or more IoT computing devices displaying media data. Content of the media data may be interpreted. At least a portion of the interpreted media data content may be selectively filtered at according to one or more user classifications. A user may be classified according to one or more user attributes, user characteristics, or user preferences. Also, the user may be classified in an anonymized user class representing a collection of one or more attributes, characteristics, or preferences of a plurality of users. A machine learning mechanism may be initialized to collect feedback data from the user, learn the one or more corrective actions for filtering media data, and/or learn the one or more corrective actions having a greatest amount of effectiveness in displaying at least the portion of the media data according to the one or more user classifications. Additionally, one or more corrective actions for filtering media data may include filtering the media data to mitigate a possible negative impact of the media data upon the user if the media data fails to match a user classification (e.g., the anonymized user class) and/or if an interpreted compliance of the media data is less than a predetermined threshold.

In one aspect, the content displayed on the computing device may be reconfigured and/or contextualized according to cultural characteristics or content compliance of the nearby detected user or group of users. An auto-switcher operation may be performed for one or more corrective/amelioration actions through prioritizing each of the corrective/amelioration actions by taking into consideration contextual information (e.g., auto-switching a channel for a period of time "T," warning and/or discouraging the viewer regarding certain programs/channels at selected time, data, and/or location, etc.).

In one aspect, real-time audio/video filtering of media data content may be performed/applied. The real-time audio/video filtering operations may include, for example: 1) monitoring an audience to learn attributes, characteristics, and/or preferences of a user (e.g., estimate an age of the members of a user/audience) of the audio/video, 2) detecting real-time audio/video content that fails to match or correspond to a selected user classification (e.g., media data fails to comply with an age-based classification and/or cultural-based classification) for at least one of the members of the audience and/or 3) performing one or more corrective/ameliorative actions when the non-compliant content and/or content that fails to comply with a user classification (e.g., the anonymized user classification) is detected.

Applying one or more of the corrective/ameliorative actions on the media content (e.g., media data classified as non-compliant according to a user profile for a user) may include, but not limited to: silencing audio/video data, replacing the audio data with a sound or selected tone, substituting one or more words in the audio, and/or substituting or "blacking out" one or more images in the video.

The monitoring the audience to estimate the age of the members of the audience further comprises the steps of: 1) using an image capturing device (e.g., a video camera, a smart phone/watch each of which includes one or more camera features and functionality/still-image camera or a video camera) to acquire images of said members of said audience, and/or 2) using age-detection operations to estimate the age of each member of such audience.

Monitoring the audience to estimate the age of the members of the audience further comprises the step of: 1) using/activating an audio capturing device and/or image capturing device, step 2) detecting voice signal and/or image signals, 3) separating the voice signals and/or image data of different members of the audience, and/or 4) using age-detection operations to estimate the age of each member of such audience based on said separated voice signal and/or image data. A viewer's attributes are first transformed by passing them through an anonymization function that retains the relative statistical distribution of the attribute value across many viewers.

In an additional aspect, a filtering operation may be performed based on a specific user profile (e.g., an abstract user profile), which is an abstract representation of a set of similar users rather than single instances of a user. The abstract user profiles may be collected and/or identified by clustering a set of users based on the view attributes of each user using k-means clustering. The abstract user profiles may be classified under filtering classes.

Also, applying real-time audio filtering of selected media content may include performing the steps of: 1) monitoring the audience to estimate one or more attributes, characteristics, preferences (e.g., an age of a user) of the members of the audience of the audio, 2) detecting in real-time audio content that is non-compliant with a user classification for at least one of the members of the audience, and/or 3) taking ameliorative actions when the non-compliant content is detected.

Also, in an additional aspect, real-time video detection of non-compliant media data relating to attributes, characteristics, and/or preferences content (e.g., content that fails to comply with one or more attributes, characteristics, and/or preferences of a user)

The non-compliant media data (e.g., age non-compliant media content as it relates to an anonymized user classification) may include: 1) delaying the display of the video, 2) using video analysis operations to detect violence or similar explicit content prior to displaying the video, and/or 3) taking ameliorative actions if violence is detected and violence is non-compliant for at least one of the members of the audience.

It should be noted that the content of media data itself may not be non-compliant; rather the context of the media data becomes important as questions of to whom the media data is directed, who the media data is from, who may view the media data, where the media data is displayed, and when the media data is displayed. It may be acceptable to display, for example, a movie or video game involving a simulated action scene for a mature audience, but the same media content may be unacceptable for less mature view such as, for example, a small child less than 12 years of age.

Accordingly, the so-called "compliance" of media data/content settings may be subjective and context dependent. For example, one solution for an appropriate and compliant level of media content settings may be interpreted and evaluated to be either satisfactory or unsatisfactory depending on viewer attributes and/or user profile of each user. Accordingly, the so-called "compliance" of particular media data/content may depend greatly upon contextual factors, such as a user profile, age/maturity levels, a type of media data, a health/emotion profile, emotional data, and other contextual factors and even a classification of media content. A deeper, cognitive analysis of the user and levels of the media data may be needed, for example based on standards, rules, policies, and practices in ethical, moral, as well as legal dimensions.

The mechanisms of the illustrated embodiments help to filter media content in situations where certain media content may be selected for selective filtering by employing a cognitive analysis using the context of the media content, in addition to other variables such as ratings of the media content, cultural factors, country-specific laws/policies, a rules system that may be adjusted towards attitude, emotion, machine learning/scoring rules, type of social network (public/private), topic of the media content, impact/potential of the media content upon a user, and the like. When one or more of these contextual factors is determined to exceed a predetermined threshold of concern, the mechanisms then may perform one or more corrective actions upon the media content to reduce and/or eliminate a potentially negative impact/implication to the user. In addition, the mechanisms of the illustrated embodiments may also monitor reaction to media content so that weighting of contextual factors, derivation of certain rules, or other calculations may be tailored by the observed feedback.

It should be noted that reference to calculating an 'interpreted compliance' against a predetermined threshold herein following may refer to implementations of a wide variety of metric analysis, data analytics, and other data processing as one of ordinary skill in the art will appreciate. For example, a predetermined threshold may be set as a numerical value, where certain kinds of communication are given certain weighted values, and an aggregate number of the weighted values is compared against the numerical threshold value. In other embodiments, a "most significant" aspect of the media content may be selected, given a weight or other metric value, and compared against a bar metric representative of the threshold.

In one embodiment, for example, media content may be organized into certain intensity levels, where a benign form of media content is assigned a lower intensity value, where potentially offensive, illegal, insensitive or other generally hazardous media content assigned a high intensity value. Here again, the media content may be examined in view of the context in which the media content is display, so that some media content may be assigned a higher intensity value in a certain context. One of ordinary skill in the art, however, will appreciate that any number of metrics may be implemented as a "threshold" comparison to accomplish the various aspects of the illustrated embodiments.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
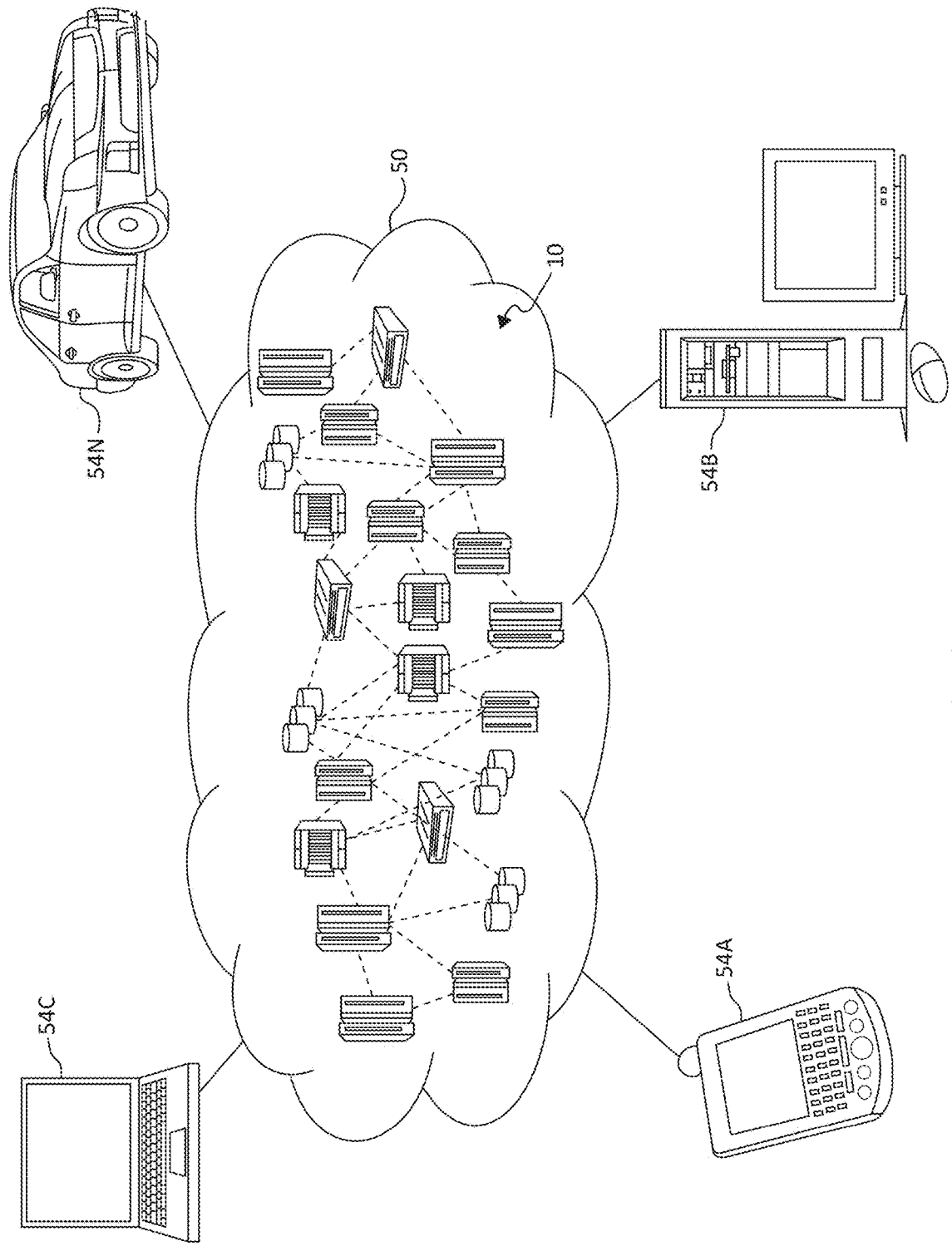
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
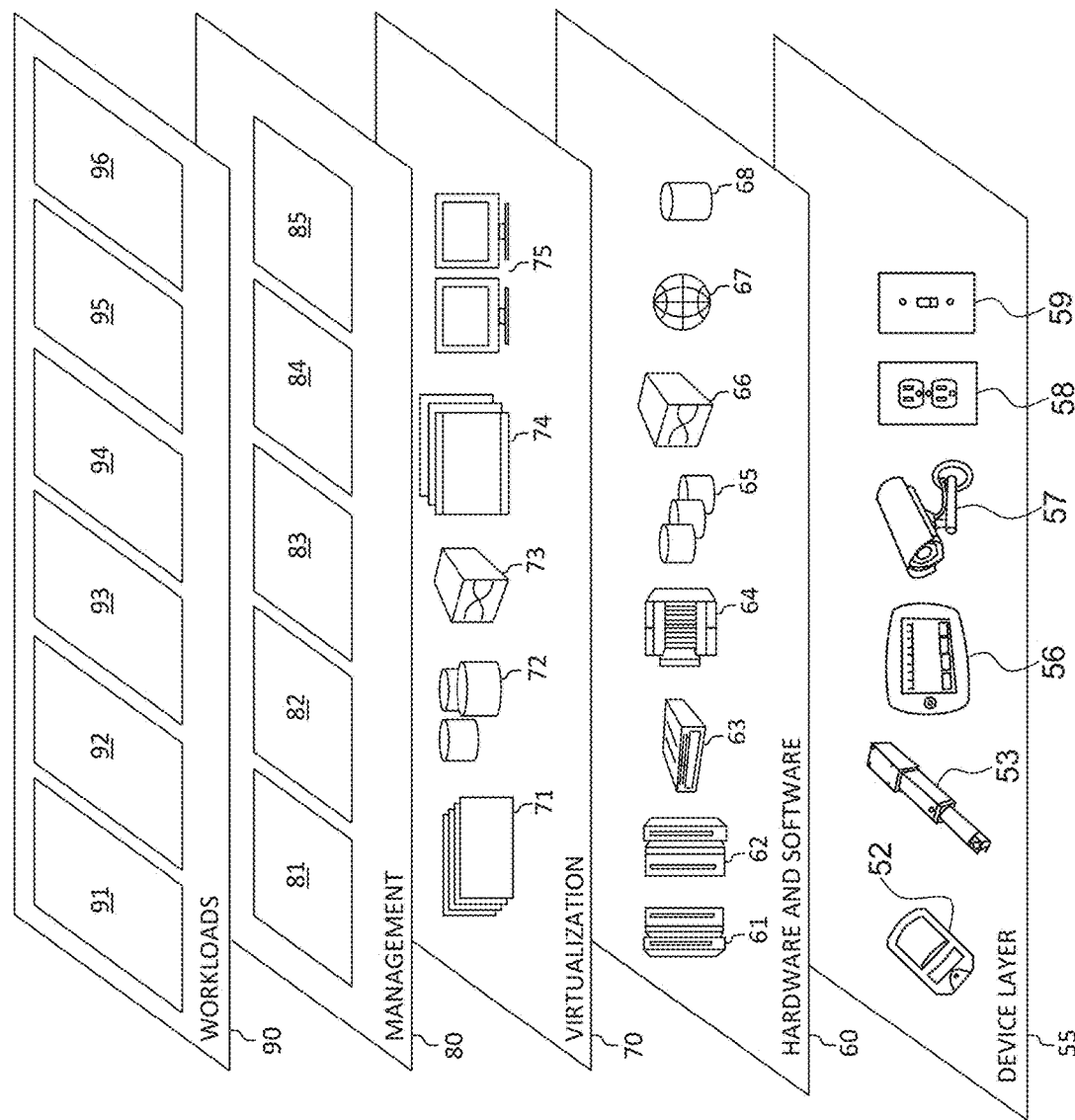
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for filtering media data. In addition, workloads and functions 96 for filtering media data may include such operations as data analysis, machine learning (e.g., artificial intelligence, natural language processing, etc.), user analysis, IoT computing device characteristic parameters, as will be further described. One of ordinary skill in the art will appreciate that the workloads and functions 96 for filtering media data may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for cognitive media data filtering in a computing environment. In one aspect, media data/content (e.g., audio or video) may be determined as non-compliant with a user classification (e.g., non-matching and/or non-compliant for a detected user). The media content and/or features may be filtered and one or more ameliorative actions/filtering actions may be triggered. The ameliorative actions/filtering actions may include, but not limited to, muting audio sounds/tones, auto-skipping non-compliant content, turning off a video/audio, auto-switching a channel (e.g., satiable for an individual nearby an IoT device), morphing the content, transferring the content to a secondary user personal device (e.g., smart phone, tablet, smart television), etc.), or performing a combination thereof.

The media content may be monitored (in real time) in conjunction with dynamic recognition of the viewers. The viewer's attributes may also be considered for determining the content which should be hidden or encapsulated during intermittent intervals, filtered in real time, or a combination thereof.

In one embodiment, the proximity of a user or group of users near a computing device that displays content is determined from various devices or signals (e.g., wearable, smartwatch and mobile phone that the users may have, Wi-Fi hotspot, beacon device, etc.). If the determined proximity of the nearby users is deemed to be risky or non-compliant based on the content displayed, the system triggers the content or device controlling module. The risk may be related to one or more user classifications that include user attributes, user characteristics, and/or user preferences such as, for example, age, cultural/social, and/or contextual factors. The detection of the user or group within a selected location from the computing device that displays the content (e.g., content interpreted as non-matching to one or more user classifications and/or interpreted as non-compliant) may be based on voice detection or visual imaging detection. For example, when a user is near an IoT computing device and the spoken voice is detected, in real-time, the viewer may receive an indication regarding: context of the user, topics related to concerns for the user, cultural characteristics of the user, a mood or emotion associated with the user, etc. The attributes of the viewers range from age and gender to cognitive state of the user (e.g., monitoring whether the parents watch a specific kind of content while in the presence of children). Hence, dynamic auto-filtering of content of media data (e.g., audio data, video data, video games, etc.) where some information can be edited) and/or language in an audio/video format based on age and context monitoring of the respective users. For instance, dynamically morphing/deleting, or editing of content based on live monitoring of viewers and hence, making an informed automated decision based on the content shown and viewers information.

The activities and/or language of the users may be monitored (e.g., monitoring user within a house) to determine the corrective action that should be performed for the identified user.

In one aspect, each user may have different viewer attributes, characteristics, and/or preferences. The viewer attributes may be classified as sensitive personal identifying information (PII) to address those concerns. Thus, each viewer's attributes (e.g., attributes, characteristics, and/or preferences) may be transformed by passing them through an anonymization function that retains the relative statistical distribution of the attribute value across many viewers so as to increase the difficulty in using any of these attributes to identify a specific viewer. Second, one or more user profiles may be used that are defined by clustering users based on their view attributes using K-means clustering. The resulting clusters may be labeled as user profiles/classifications (e.g., all users in age group 40-45, who are 5-6 feet tall and speak English).

These user profiles are then classified under filtering classes. For a new viewer, an appropriate cluster may be selected based on proximity (e.g., mean for k-means clustering, etc.) to one of the clusters in a set of the defined clusters. In this way, the cognitive media data filtering operations may ensure that the filtering is performed based on a specific user profile, which is an abstract representation of a set of similar users rather than instances (per person basis).

In one aspect, the corrective actions (e.g., appropriate and/or ameliorative actions) may be in the form or audio filtering and/or dynamic modification to the media content (e.g., audio content, video content including video games) to make it suitable to each user who is or may be watching at a particular point of time. In one aspect, locking one or more channels can occur with the utilization of these monitoring operation when persons below a specified age limit are the viewers so that they cannot be viewed at all. The operation of auto-skipping content further may be based on an active learning operations which may, in real-time, analyze the content against the detected user or group of users' non-compliant content or disagreeable characteristics. The active learning operation may further take into consideration the user or group cultural/social group/network and then dynamically translate the learned non-compliant content or disagreeable characteristics for the user or group into filtering policies and rules.

Figure 4:
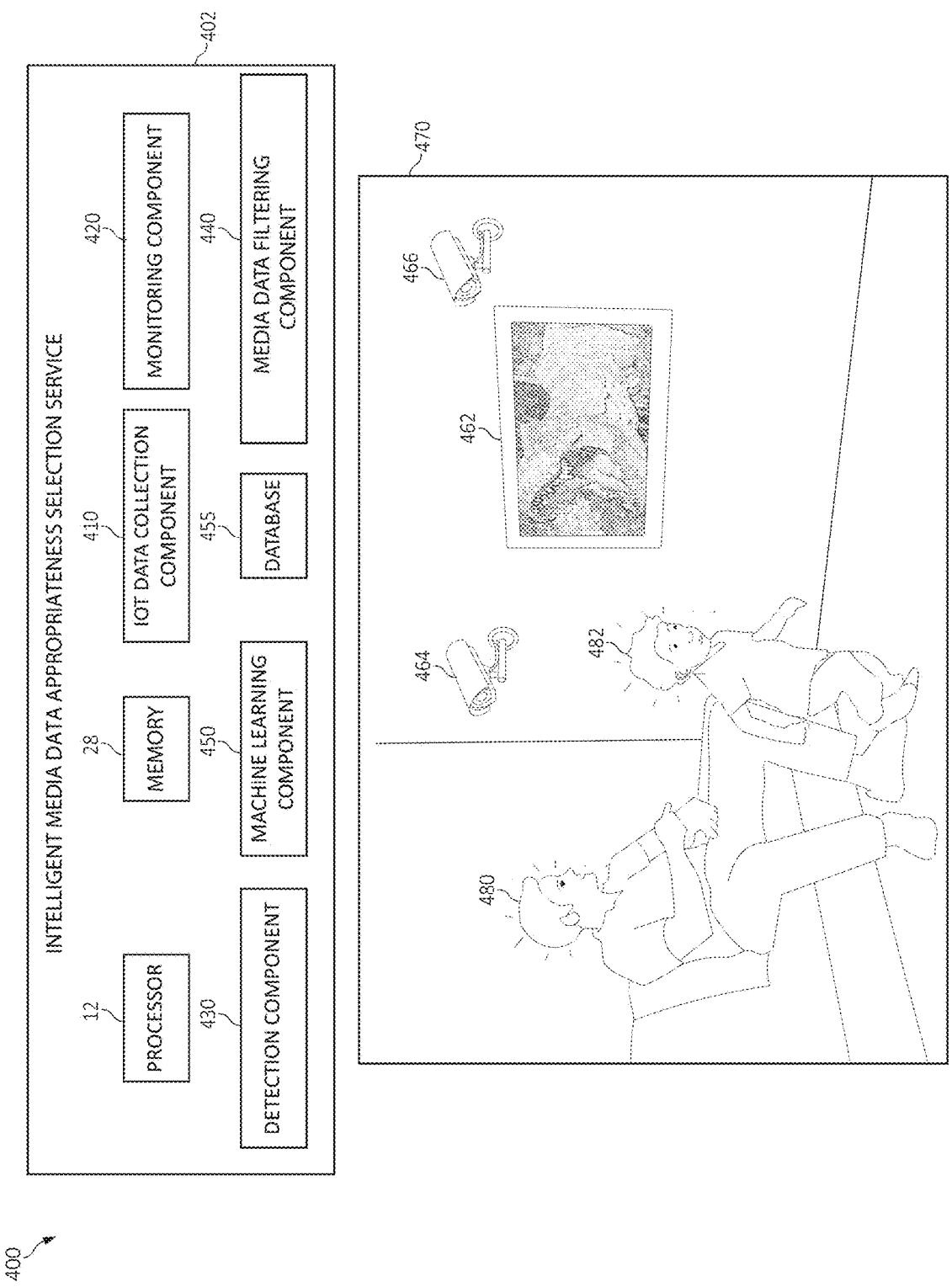
FIG. 4 is an additional block diagram depicting an exemplary functional relationship between various aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as an intelligent media data compliance selection service 402, having an IoT device collection component 410, a monitoring component 420, a detection component 430, a media data filtering component 440, a machine learning component 450, a database 455, each of which may work in communication with each other.

Additionally, the intelligent media data compliance selection service 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The intelligent media data compliance selection service 402 may be in communication with one or more IoT devices such as, for example, IoT computing devices 462, 464, and/or 466. In one aspect, the IoT computing device 462 may be a media display device (e.g., a television, projection screen system, computer, laptop, and/or other devices configured to display audio and/or video data on as screen). The IoT computing device 462 may also be one or more various types of communication systems (e.g., speakers, voice-activated hubs, etc.) capable of generating audio data).

One or more IoT computing devices such as, for example, IoT computing devices 464 and 466 may be used to determine a presence of one or more users and/or monitor and collect a person's personal data such as, for example, data relating to one or more health state, emotional state, medical conditions, a well-being (e.g., subjective well-being "SWB", emotional well-being, mental well-being, physical well-being, or an overall well-being) of the user, an emotional state of the user, biometric data, behavior patterns, a health profile of the user, or a combination thereof in relation to various types of media content listed to or viewed by a user. In one aspect, well-being may be generally described as a normal/standardized or satisfactory condition of existence of the user or a state characterized by health, happiness, emotional stability, mental stability, physical stability, or success. As one of ordinary skill in the art will appreciate, "well-being" may be dependent on a number of factors, including such factors as medical condition, emotional stability, mental stability, physical stability, financial stability, a degree or level of happiness, or other factors that may be learned.

The IoT computing devices 462, 464, and/or 466 may be devices used by cloud computers, such as, for example, the PDA or cellular telephone 54A, desktop computer 54B, laptop computer 54C, and/or automobile computer system 54N as described in FIG. 2. The IoT devices may also be sensor-based devices (e.g., body mounted/implanted sensors and/or a smartwatch).

The IoT device collection component 410 may be used to harvest, collect, and store personal data in the database 455. The machine learning component 450 may continuously and automatically receive feedback, according to the intelligent media data compliance selection service 402 (e.g., a media data filtering service) applications for each user, from one or more IoT devices, such as IoT devices 462, 464, and/or 466 via a communication link 475 (e.g., wired or wireless technology including for example, but not limited to: cellular, WAN, wireless fidelity ("Wi-Fi"), Wi-Max, WLAN, Bluetooth technology, a combination thereof, and/or the like). The IoT device collection component 410 may both detect a presence of one or more users (e.g., users 480 and/or 482) and determine whether or not each of users associated with the IoT devices 462, 464, and/or 466 are reacting negatively and/or positively to the type of content being displayed by IoT computing device 462 (e.g., a television).

The IoT device collection component 410 may parse through the collected data from one or more of the IoT devices, such as IoT devices 462, 464, and/or 466 (e.g., IoT device 460) which may be "wearable" devices, associated with the user to identify one or more categories that includes identifying an age of the user, medical history, medical history of one or more persons associated with the user, financial conditions, status of employment, a social media user profile, social media communication patterns, favorable and unfavorable entertainment interests, food preferences, profile types and characteristics of persons associated with the user, an emotional state of the user, biometric data, behavior patterns, or a combination thereof. The IoT computing devices 462, 464, and/or 466 may be sensors that are near a person or physically coupled to the person are able to measure quantities that are be associated with one or more of movement of the person, physiological measurements of the person, biometric measurements used to identify the person, environmental information for the person, data from equipment held by or otherwise used by the person, any suitable measurement, or combinations of these.

In one aspect, the intelligent media data compliance selection service 402, using IoT devices 462, 464, and/or 466, may capture record, and/or detect the presence of one or more users (e.g., users 480 and/or 482) within a proximity distance to a computing device such as, for example, IoT device 462 that displays media content (e.g., audio data and/or video data) to one or more viewers (e.g., users 480 and/or 482). That is, the detection component 430 may determine a user is within a defined proximity to one or more IoT computing devices displaying media data.

In an additional aspect, the monitoring component 420 may monitor and analyze behavior of the one or more users (e.g., users 480, and/or 482), real-time biometric parameters, body language, contextual factors, feedback data, patterns of discomfort to the health/emotional state, or combination thereof with respect to the displayed media content. If the monitoring component 420 identifies that one or more viewers/users 480 and/or 482 are experiencing a negative emotion (e.g., fear or stress), for example, while observing (e.g., listening or watching) or about to observe the media content, the media data filtering component 440 (associated with entertainment system environment 470) may select an compliance of (e.g., filter) the media data using one or more corrective actions as described herein.

The media data filtering component 440 may cognitively interpret, analyze, and/or process the media data (e.g., interpret a degree of compliance of the media data) according to a plurality of identified contextual factors and selectively filter at least a portion of the media data to mitigate a possible negative impact of the media data upon the user if the interpreted compliance is less than a predetermined threshold. Cognitively interpreting the compliance of the media data based on the plurality of identified contextual factors may further include interpreting legal, ethical, moral, cultural, ethnicity, media data ratings or courteous ones of the contextual factors in view of the media data.

The media data filtering component 440 may transform one or more viewer attributes of the user by passing the view attributes through an anonymization operation that retains a relative statistical distribution of values of the view attributes across a set of similar users forming an abstract user profile that is an abstract representation of the set of similar users. The media data filtering component 440 may select/filter the content interpreted as non-compliant according to the abstract user profile (e.g., a user classification) using one or more corrective actions.

The media data filtering component 440 may estimate a risk factor of one or more users (or the abstract user profile) for both current settings and a predicted adjustment of the features and/or characteristics associated with displayed media content. The media data filtering component 440 may define the risk factor as having a potentially negative impact upon a health state, emotional state, or combination thereof of the one or more users or even the abstract user profile. The media data filtering component 440 determine the risk factor according a user profile/abstract user profile, one or more contextual factors, and one or more characteristics of the displayed media content. The media data filtering component 440 may also determine, set, and/or define a selected threshold for controlling and/or selecting compliance and/or filtering media data characteristics, or combination thereof. For example, risk factors determined to be above the selected threshold may trigger the media data filtering component 440 to initiate one or more corrective actions to the media data such as, for example, pausing a streaming video, muting audio sounds/tones, skipping a portion of the video/audio, changing a channel to an age-appropriate channel for the detected user, dubbing over the media content with alternative media data.

The filtering of media data may include muting audio data, skipping non-compliant media data, delaying turning off the media data, switching channels of the one or more IoT computing devices, morphing the media data, switching sounds or tones of the media data, substituting or "blacking out" data of the media data, transferring the media data to an alternative IoT computing device, or a combination thereof.

The media data filtering component 440 may: 1) reconfigure the media data displayed on the IoT computing device according to the plurality of identified contextual factors, 2) filter the media data according to the interpreted compliance for the user, and/or 3) classify the user into one or more user classes according to one or more attributes, characteristics, and/or preferences of the user.

Also, the media data filtering component 440 may identify one or more attributes, characteristics, or preferences of the use and/or classify the user into an anonymized user class representing a collection of one or more attributes, characteristics, or preferences of a plurality of users.

The machine learning component 450 may be initiated to collect feedback data from the user, learn the one or more corrective actions for the filtering, and/or learn the one or more corrective actions having a greatest amount of effectiveness in minimizing the possible negative impact of the media data upon the user. The machine learning component 450 may initialize a machine learning operation to monitor the displayed media content, learn the risk factor for the one or more users and reaction to the displayed media content. Additionally, the machine learning component 450 may be initialized to learn a type of data of the user to be included in the user profile, age-dependent factors and characteristics, or a combination thereof.

The machine learning component 450, in conjunction with the monitoring component 420, may be used to track, monitor, and analyze feedback relating to the IoT devices, such as IoT devices 462, 464, and/or 466 relating to the intelligent media data compliance selection service 402. For example, the machine learning component 450 may collect, learn, and aggregate the data of the user with collected data from one or more additional users. The machine learning component 450 may use one or more machine learning operations such as, for example, an instance of IBM® Watson® such as Watson® Analytics (IBM® and Watson® are trademarks of International Business Machines Corporation).

The machine learning component 450 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In view of the various components and functionality of FIGS. 1-5, consider the following operational and implementation steps. In step 1, one or more IoT devices (e.g., Smart TV, Smart phone, cameras, voice-activated hub/personal assistance) may monitor one or more users at a particular point of time at a selected location (e.g., a house). In step 2) every user of the selected location may have a user profile stored as a user ID in a storage system (e.g., a cloud computing system/database).

In step 3) a voice recognition and/or facial recognition operation may determine each active viewers of displayed or provided media content (e.g., parents in a family room watching an age-appropriate comedy program) and identify all other users present in the selected location (one or more children of the parents in the home in different locations). In step 4) if any person's information (e.g., a guest) is detected but not stored in a profile for the selected location, a cognitive, informed decision may be performed if the content will be filtered or not based on detected attributes of the user. The attributes of the user that may be considered may include, for example, estimating age and/or gender, monitoring a conversation of the user with other members to identify, estimate, and/or guess details about each person in a home (e.g., an unknown guest enters the home, a child yells "grandma is here" to which the guest replies "come and see grandma" thus "grandma" is identified as an adult female that may have a supervisory role, etc.), physical activities of the user (for e.g., playing with children and tone of the user) etc.

In step 5, a natural language processing ("NLP") operation may be employed for keyword extraction and analysis using a machine learning operation inculcated with the live monitoring in order to understand the context and language being used by the respective viewers. In step 6) an NLP keyword extraction and feature extraction operation (e.g., Mel Frequency Cepstral Coefficients "MFCC") may be used for feature extraction and matching of the media content in conjunction with the keywords and facial recognition in order to provide the correct evaluation in terms of the active viewers who are engaged in the conversation.

In step 7) a secondary authentication factor may be applied by matching a biometric data (e.g., a voice) stored in the storage system (e.g., cloud computing service database) with a facial and/or voice recognition and characteristics of the viewers in order to determine a type of media content which will be filtered. In step 8), once the viewer attributes of each of the users are determined, one or more user privacy preferences may be determined and checked to understand whether the user privacy preferences are prohibitive in terms of using the non-anonymized data for analytics purposes. If found so, steps 9 and 10 are followed.

In step 9), viewer attributes are transformed by passing them through an anonymization operation that retains the relative statistical distribution of the attribute value across many viewers to as to increase the difficulty in using any of the view attributes to identify a specific viewer. In step 10), one or more user attributes may then be mapped to an abstracted user profile. For example, instead of using the user profile of "User: Steve, Age: 10, Height: 4.5), step 10 may map the user profile to a generic profile such as, for example, "User: Male, Age: 10-13, Height: 4-5 feet). The generic profiles are defined by clustering users based on their attributes using K- means clustering and resulting clusters may be labelled as user profiles (e.g., all male users in age group 10-13 who are 4-5 feet tall and speak English). These generic/generalize user profiles (e.g., an abstract user profile) are then classified under filtering classes.

For a new viewer, an appropriate cluster may be selected based on an estimation and/or proximity (e.g., mean for k-means clustering, etc.) to one of the clusters in the set of above defined clusters. In this way, the filtering of media data may be performed based on a specific user profile, which is an abstract representation of a set of similar users rather than instances (per person basis).

In step 11), each filtering class used in step 10 may have a set of filtering or content modification defined. In step 12), based on the filtering class selected in step 10, the video content and audio content may be dynamically modified and can be filtered accordingly.

In step 13), the same factors (including age of the users and initial data) may either be predefined by one or more persons of the selected location and/or can be pre-adjusted based on the active monitoring.

In step 14), at least a partial edit of the content may be performed (e.g., in an analog fashion) if multiple persons of a certain age are sitting together and watching as the attributes of a youngest and an oldest member of the group may be considered for making an informed decision.

In step 15), feature extraction and matching with the attributes may also be performed during display of the media content (e.g., video games) in which the content (audio/video) may be dynamically modified or morphed based on the user's attributes.

Figure 5:
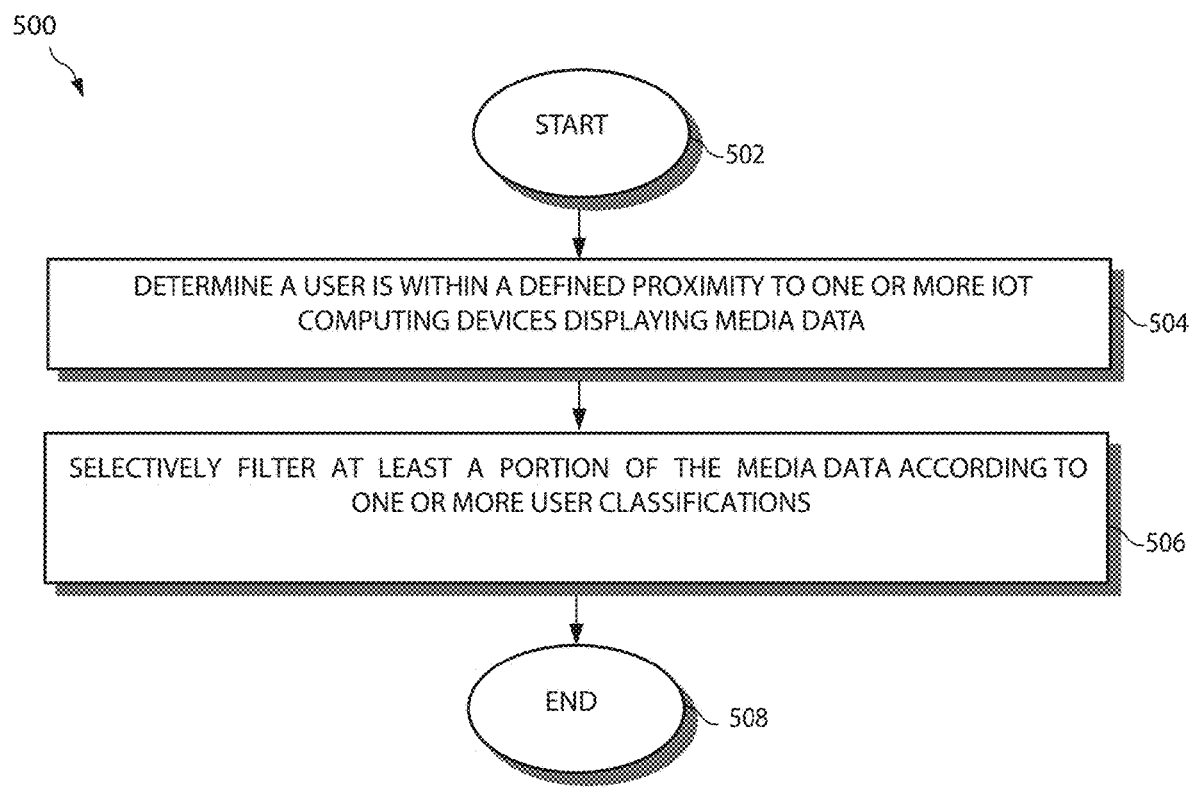
FIG. 5 is a flowchart diagram depicting an exemplary method for filtering media data in an Internet of Things (IoT) computing environment in which aspects of the present invention may be realized.

Turning now to FIG. 5, a method 500 for implementing intelligent media content filtering in an Internet of Things (IoT) computing environment is depicted. The functionality 500 may be implemented as a method executed as instructions on a machine, where the instructions are included on at least one computer readable medium or on a non-transitory machine-readable storage medium. The functionality 500 may start in block 502.

User preferences (and/or a user profile having a defined classification of compliant and non-compliant media data) for the media data may be determined according to a plurality of identified contextual factors, as in block 504. At least a portion of the media data may be selectively filtered according to one or more user classifications (e.g., the defined classification of compliant and non-compliant media data), as in block 506. That is, non-compliant media data may be selectively filtered according to the one or more user classifications. The functionality 500 may end in block 508.

Figure 6:
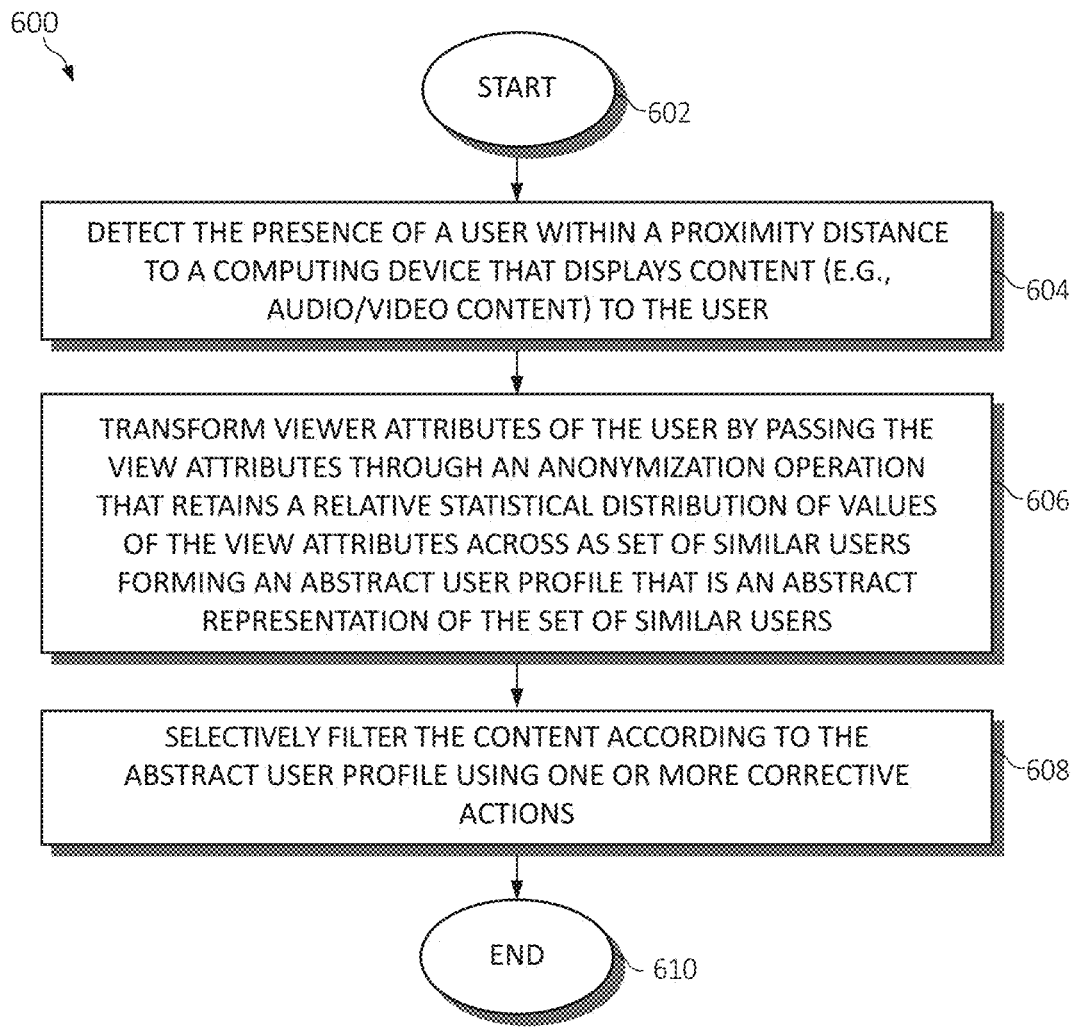
FIG. 6 is a flowchart diagram depicting an additional exemplary method for filtering media data in an Internet of Things (IoT) computing environment in which aspects of the present invention may be realized.

Turning now to FIG. 6, a method 600 for implementing cognitive media content filtering in an Internet of Things (IoT) computing environment is depicted. The functionality 600 may be implemented as a method executed as instructions on a machine, where the instructions are included on at least one computer readable medium or on a non-transitory machine-readable storage medium. The functionality 600 may start in block 602.

A presence of a user may be detected within a proximity distance to a computing device that displays content (e.g., audio/video content) to the user, as in block 604. One or more viewer attributes of the user may be transformed by passing the view attributes through an anonymization operation that retains a relative statistical distribution of values of the view attributes across as set of similar users forming an abstract user profile that is an abstract representation of the set of similar users, as in block 606. The content may be selectively filtered according to the abstract user profile using one or more corrective actions, as in block 608. The functionality 600 may end in block 610.

In one aspect, in conjunction with and/or as part of at least one block of FIGS. 5-6, the operations of methods 500 and/or 600 may include each of the following. The operations of methods 500 and/or 600, pursuant to filtering at least the portion of the media data, may further interpret legal, ethical, moral, cultural, ethnicity, media data ratings or courteous ones of the contextual factors in view of the media data. The operations of methods 500 and/or 600, pursuant to filtering at least the portion of the media data, may further filter at least the portion of the media data by muting audio data, skipping media data, delaying turning off the media data, switching channels of the one or more IoT computing devices, morphing the media data, switching sounds or tones of the media data, substituting data of the media data, transferring the media data to an alternative IoT computing device, or a combination thereof.

The operations of methods 500 and/or 600 may classify the user into one or more filtering classes according to one or more attributes, characteristics, or preferences of the user. The operations of methods 500 and/or 600 may identify one or more attributes, characteristics, or preferences of the user, and/or classify the user into an anonymized user class representing a collection of one or more attributes, characteristics, or preferences of a plurality of users. The media data displayed on the IoT computing device may be reconfigured according to the plurality of identified contextual factors. The media data may be filtered according to the interpreted compliance for the user.

The operations of methods 500 and/or 600 may initialize a machine learning mechanism to: 1) collect feedback data from the user, 2) learn the one or more corrective actions for filtering media data, and/or 3) learn the one or more corrective actions having a greatest amount of effectiveness in displaying at least the portion of the media data according to the one or more user classifications. Also, the operations of methods 500 and/or 600 may initialize the machine learning mechanism learn one or more corrective actions having a greatest amount of effectiveness in minimizing a possible negative impact of the media data upon the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent media data filtering in an Internet of Things (IoT) computing environment, comprising:
    when viewing media associated with media data, identifying one or more attributes, characteristics, or preferences of a user related to a consumption of the media data, wherein the identifying is inclusive of identifying an age of the user and further determining those portions of the media that negatively impacts the user or is inappropriate for the user to view;
    selectively filtering, in real-time, at least a portion of the media data according to the one or more attributes, characteristics, or preferences of the user;
    determining a second user has entered within a defined proximity to one or more IoT computing devices displaying the media data;
    determining an identity of the second user, wherein, when the second user has not been previously input nor identified, the identifying includes cognitively inferring the one or more attributes, characteristics, or preferences of the second user by auditory cues, wherein the auditory cues include statements from alternative users proximate to the second user by which a prediction is inferred as to the age of the second user and any cultural preferences of the second user;
    in conjunction with determining the identity of the second user, determining privacy preferences, stored in a database, associated with the user and the second user, wherein when the privacy preferences are prohibitive of sharing non-anonymized data, the user and the second user are classified into an anonymized user class representing a collection of the one or more attributes, characteristics, or preferences of a plurality of users such that the one or more attributes, characteristics, or preferences of each of the plurality of users is passed through a clustering operation that retains relative statistical distributions of values of the one or more attributes, characteristics, or preferences across the plurality of users to increase difficulty in using the values to specifically identify the user and the second user; and
    reconfiguring the selective filtering of the at least a portion of the media data according to one or more user classifications each representing the plurality of users, wherein reconfiguring the selective filtering includes filtering the media data with respect to a cultural classification of the one or more user classifications to selectively remove non-compliant content associated with the cultural preferences of the second user.

2. The method of claim 1, wherein selectively filtering at least the portion of the media data further includes interpreting legal, ethical, moral, cultural, ethnicity, media data ratings or courteous ones of a plurality of contextual factors in view of the media data.

3. The method of claim 1, wherein selectively filtering at least the portion of the media data further includes muting audio data, skipping the media data, delaying turning off the media data, switching channels of the one or more IoT computing devices, morphing the media data, switching sounds or tones of the media data, substituting data of the media data, transferring the media data to an alternative IoT computing device, or performing a combination thereof.

4. The method of claim 1, further including reconfiguring the media data displayed on the IoT computing device according to a plurality of identified contextual factors.

5. The method of claim 1, further including classifying the user, under the anonymized user class, further into one or more filtering classes according to the one or more attributes, characteristics, or preferences of the user.

6. The method of claim 1, further including initializing a machine learning mechanism to:
    collect feedback data from the user;
    learn the one or more corrective actions for filtering the media data; and
    learn the one or more corrective actions having a greatest amount of effectiveness in displaying at least the portion of the media data according to the one or more user classifications.

7. A system for intelligent media data filtering in an Internet of Things (IoT) computing environment, comprising:
    one or more computers with executable instructions that when executed cause the system to:
        when viewing media associated with media data, identify one or more attributes, characteristics, or preferences of a user related to a consumption of the media data, wherein the identifying is inclusive of identifying an age of the user and further determining those portions of the media that negatively impacts the user or is inappropriate for the user to view;
        selectively filter, in real-time, at least a portion of the media data according to the one or more attributes, characteristics, or preferences of the user;
        determine a second user has entered within a defined proximity to one or more IoT computing devices displaying the media data;
        determine an identity of the second user, wherein, when the second user has not been previously input nor identified, the identifying includes cognitively inferring the one or more attributes, characteristics, or preferences of the second user by auditory cues, wherein the auditory cues include statements from alternative users proximate to the second user by which a prediction is inferred as to the age of the second user and any cultural preferences of the second user;

in conjunction with determining the identity of the second user, determine privacy preferences, stored in a database, associated with the user and the second user, wherein when the privacy preferences are prohibitive of sharing non-anonymized data, the user and the second user are classified into an anonymized user class representing a collection of the one or more attributes, characteristics, or preferences of a plurality of users such that the one or more attributes, characteristics, or preferences of each of the plurality of users is passed through a clustering operation that retains relative statistical distributions of values of the one or more attributes, characteristics, or preferences across the plurality of users to increase difficulty in using the values to specifically identify the user and the second user; and reconfigure the selective filtering of the at least a portion of the media data according to one or more user classifications each representing the plurality of users, wherein reconfiguring the selective filtering includes filtering the media data with respect to a cultural classification of the one or more user classifications to selectively remove non-compliant content associated with the cultural preferences of the second user.

8. The system of claim 7, wherein the executable instructions, pursuant to filtering at least the portion of the media data, further interpret legal, ethical, moral, cultural, ethnicity, media data ratings or courteous ones of a plurality of contextual factors in view of the media data.

9. The system of claim 7, wherein the executable instructions, pursuant to filtering at least the portion of the media data, further filter at least the portion of the media data by muting audio data, skipping the media data, delaying turning off the media data, switching channels of the one or more IoT computing devices, morphing the media data, switching sounds or tones of the media data, substituting data of the media data, transferring the media data to an alternative IoT computing device, or a combination thereof.

10. The system of claim 7, wherein the executable instructions reconfigure the media data displayed on the IoT computing device according to the plurality of identified contextual factors.

11. The system of claim 7, wherein the executable instructions classify the user, under the anonymized user class, further into one or more filtering classes according to the one or more attributes, characteristics, or preferences of the user.

12. The system of claim 7, wherein the executable instructions initialize a machine learning mechanism to:
collect feedback data from the user;
learn the one or more corrective actions for filtering the media data; and
learn the one or more corrective actions having a greatest amount of effectiveness in displaying at least the portion of the media data according to the one or more user classifications.

13. A computer program product for intelligent media data filtering in an Internet of Things (IoT) computing environment by a processor, the computer program product comprising a non-transitory computer-readable storage medium having computer-readable program code portions stored therein, the computer-readable program code portions comprising:

an executable portion that, when viewing media associated with media data, identifies one or more attributes, characteristics, or preferences of a user related to a consumption of the media data, wherein the identifying is inclusive of identifying an age of the user and further determining those portions of the media that negatively impacts the user or is inappropriate for the user to view;

an executable portion that selectively filters, in real-time, at least a portion of the media data according to the one or more attributes, characteristics, or preferences of the user;

an executable portion that determines a second user has entered within a defined proximity to one or more IoT computing devices displaying the media data;

an executable portion that determines an identity of the second user, wherein, when the second user has not been previously input nor identified, the identifying includes cognitively inferring the one or more attributes, characteristics, or preferences of the second user by auditory cues, wherein the auditory cues include statements from alternative users proximate to the second user by which a prediction is inferred as to the age of the second user and any cultural preferences of the second user;

an executable portion that, in conjunction with determining the identity of the second user, determines privacy preferences, stored in a database, associated with the user and the second user, wherein when the privacy preferences are prohibitive of sharing non-anonymized data, the user and the second user are classified into an anonymized user class representing a collection of the one or more attributes, characteristics, or preferences of a plurality of users such that the one or more attributes, characteristics, or preferences of each of the plurality of users is passed through a clustering operation that retains relative statistical distributions of values of the one or more attributes, characteristics, or preferences across the plurality of users to increase difficulty in using the values to specifically identify the user and the second user; and an executable portion that reconfigures the selective filtering of the at least a portion of the media data according to one or more user classifications each representing the plurality of users, wherein reconfiguring the selective filtering includes filtering the media data with respect to a cultural classification of the one or more user classifications to selectively remove non-compliant content associated with the cultural preferences of the second user.

14. The computer program product of claim 13, further including an executable portion that, pursuant to selectively filtering at least the portion of the media data, further:
interprets legal, ethical, moral, cultural, ethnicity, media data ratings or courteous ones of a plurality of contextual factors in view of the media data; or
filters at least the portion of the media data as muting audio data, skipping the media data, delaying turning off the media data, switching channels of the one or more IoT computing devices, morphing the media data, switching sounds or tones of the media data, substituting data of the media data, transferring the media data to an alternative IoT computing device, or a combination thereof.

15. The computer program product of claim 13, further including an executable portion that reconfigures the media data displayed on the IoT computing device according to a plurality of identified contextual factors.

16. The computer program product of claim 13, further including an executable portion that classifies the user, under the anonymized user class, further into one or more filtering classes according to the one or more attributes, characteristics, or preferences of the user.

17. The computer program product of claim 13, further including an executable portion that initializes a machine learning mechanism to:
 collect feedback data from the user;
 learn one or more corrective actions for filtering the media data; and
 learn the one or more corrective actions having a greatest amount of effectiveness in displaying media data according to the one or more user classifications.

\* \* \* \* \*